(12) United States Patent
Yeh

(10) Patent No.: US 9,690,569 B1
(45) Date of Patent: Jun. 27, 2017

(54) METHOD OF UPDATING FIRMWARE OF A SERVER RACK SYSTEM, AND A SERVER RACK SYSTEM

(71) Applicant: Mitac Computing Technology Corporation, Taoyuan (TW)

(72) Inventor: Yi-Yuan Yeh, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 15/090,865

(22) Filed: Apr. 5, 2016

(51) Int. Cl.
*G06F 9/445* (2006.01)
*H04L 29/08* (2006.01)

(52) U.S. Cl.
CPC ............. *G06F 8/65* (2013.01); *H04L 67/34* (2013.01)

(58) Field of Classification Search
None
See application file for complete search history.

(56) References Cited

U.S. PATENT DOCUMENTS

| 2014/0137095 A1* | 5/2014 | Chiu | G06F 8/665 717/171 |
| 2016/0026459 A1* | 1/2016 | Yang | H04L 67/06 717/171 |

* cited by examiner

*Primary Examiner* — Chuck Kendall
(74) *Attorney, Agent, or Firm* — Jacobson Holman, PLLC.

(57) ABSTRACT

A method of updating firmware of a server rack system includes: receiving, by a rack management controller (RMC), a firmware updating program; broadcasting, by the RMC, an update notification to a rack back plate (RBP); after receiving the update notification, transmitting one by one, by the RBP, request messages which are associated with respective ones of sections of the firmware updating program to the RMC; responding, by the RMC, to each of the request messages by transmitting the respective one of the sections to the RBP; and after receiving the sections of the firmware updating program, recovering, by the RBP, the firmware updating program at least from the complete sections for subsequent firmware update.

20 Claims, 6 Drawing Sheets

METHOD OF UPDATING FIRMWARE OF A SERVER RACK SYSTEM, AND A SERVER RACK SYSTEM

FIELD

The disclosure relates to a method and a server rack system, more particularly to a method of updating firmware of a server rack system, and a server rack system implementing the method.

BACKGROUND

Referring to FIG. 1, a block diagram of a rack server system is illustrated. The rack server system includes a Rack Management Controller (RMC) 100, a plurality of Rack Back Planes (RBPs) 200 and a plurality of servers 700. Each of the servers 700 includes a Baseboard Management Controller (BMC) 300. Each of the RBPs 200 is connected electrically between the RMC 100 and corresponding multiple ones of the BMCs 300 of corresponding multiple ones of the servers 700. Each of the servers 700 is a node capable of independent operation and including electronic components, such as a central processing unit (CPU), a southbridge, a northbridge, volatile memory, a storage unit and a network chip.

The rack server system further includes a plurality of fan sets 400, a Power Distribution Board (PDB) 500 and a plurality of Power Supply Units (PSUs) 600. Each of the RBPs 200 is connected to a respective one of the fan sets 400, for heat dissipation of the corresponding ones of the servers 700 which are connected to the RBP 200. Each of the PSUs 600 provides operational power to a respective one of the RBPs 200, to the servers 700 correspondingly connected to the respective RBP 200, and to the fan set 400 connected to the respective RBP 200. Each of the fan sets 400 includes one or more fans, and is controlled by the respective RBP 200 based on operating parameters, e.g., temperature of the CPUs, environmental temperature, etc., which are collected by the servers 700 connected to the respective RBP 200.

It has been known that the RMC 100 and the RBP 200s each include a processor unit provided with a firmware program. However, since the RBPs 200 do not include a port for external connection, when firmware update of the RBPs 200 is desired, transmission of a firmware updating program to the RBPs 200 must be carried out by means of the RMC 100. Moreover, transmission of the firmware updating program to a next one of the RBPs 200 cannot be implemented until a current one of the RBPs 200 has completed receipt of the firmware updating program, where the firmware updating program is transmitted section by section with the firmware updating program being composed of a plurality of sections. In addition, conventionally, once a section of the firmware updating program is transmitted by the RMC 100 to the RBP 200, a response from the RBP 200 confirming successful receipt of the section is required before the RMC 100 can transmit the next section to the RBP 200. Since the server rack system 100 may include tens or more of the RBPs 200, detection for timeout or packet loss is required during the transmission process, and retransmission of the lost packet may be required. Therefore, it takes considerable time for completing firmware updates of all of the RBPs 200. For example, if firmware having a file size of 200 KB to 400 KB is provided to ten RBPs for firmware update, it takes about ten to fifteen minutes to complete the whole updating process. In addition, during the updating process, when update failure occurs in one of the RBPs 200, the whole updating process terminates. It takes more time for a maintainer to determine which one of the RBPs 200 has not been updated.

SUMMARY

Therefore, an object of the disclosure is to provide a method of updating firmware of a server rack system and a server rack system that can alleviate at least one of the drawbacks of the prior art.

According to a first aspect of the disclosure, the method is associated with updating firmware of a server rack system. The server rack system includes a rack management controller (RMC) and a rack back plane (RBP) The RMC includes a first processor, a first storage device, a first communication interface, an external communication interface and a rack management subsystem. The rack management subsystem includes a broadcast module and a program update module. The RBP includes a second processor, a second storage device and a second communication interface. The second storage device stores an original firmware program to be executed by the second processor. The method includes following steps of:

receiving, by the external communication interface, a firmware updating program which is to be stored in the first storage device of the RMC;

broadcasting, by the broadcast module of the rack management subsystem of the RMC, an update notification which is associated with the firmware updating program to the second communication interface of the RBP via the first communication interface;

after receiving the update notification via the second communication interface, transmitting one by one, by the second processor of the RBP, a plurality of request messages which are associated with respective ones of sections of the firmware updating program to the RMC via the second communication interface;

responding, by the program update module of the rack management subsystem of the RMC, to each of the request messages by transmitting the respective one of the sections of the firmware updating program via the first communication interface to the RBP which transmits the request message; and after receiving the sections of the firmware updating program with which the request messages are associated, recovering, by the RBP, the firmware updating program at least from the sections with which the request message are associated so as to update the original firmware program using the firmware updating program thus recovered.

According to a second aspect of the disclosure, the server rack system includes a rack management controller (RMC) and a rack back plane (RBP). The RMC includes a first processor, a first storage device, a first communication interface, an external communication interface and a rack management subsystem that are electrically connected to each other. The rack management subsystem includes a broadcast module and a program update module. The rack back plane (RBP) includes a second processor, a second storage device and a second communication interface communicably connected to the first communication interface. The second storage device stores an original firmware program to be executed by the second processor. The external communication interface receives a firmware updating program which is to be stored in the first storage device of the RMC. The broadcast module of the rack management subsystem of the RMC broadcasts an update notification which is associated with the firmware updating program to the second communication interface of the RBP via the first communication interface. After receiving the update notification via the second communication interface, the second processor of the RBP transmits one by one a plurality of request messages which are associated with respective ones of sections of the firmware updating program to the RMC via the second communication interface. The program update module of the rack management subsystem of the RMC responds to each of the request messages by transmitting the respective one of the sections of the firmware updating program via the first communication interface to the RBP which transmits the request message. After receiving the sections of the firmware updating program with which the request messages are associated, the RBP recovers the firmware updating program at least from the sections with which the request messages are associated so as to update the original firmware program using the firmware updating program thus recovered.

An effect of the method of updating a server rack system according to this disclosure resides in that, by changing the conventional steps of firmware update, transmission of response signals as to whether or not the respective sections of the firmware updating program are correctly received may be omitted. The conventional steps includes first transmitting a section of the firmware updating program by the RMC to the RBP, then having the RBP respond to the RMC as to whether or not the section is correctly received, and after that transmitting a next section of the firmware updating program by the RMC if the response indicates correct reception. Meanwhile, all of the RBPs may be updated simultaneously so as to further save time by half compared with the conventional steps, and to reduce a risk of update interruption due to an update error in one of the RBPs.

BRIEF DESCRIPTION OF THE DRAWINGS

Other features and advantages of the disclosure will become apparent in the following detailed description of embodiment(s) with reference to the accompanying drawings, of which.

DETAILED DESCRIPTION

Figure 1:
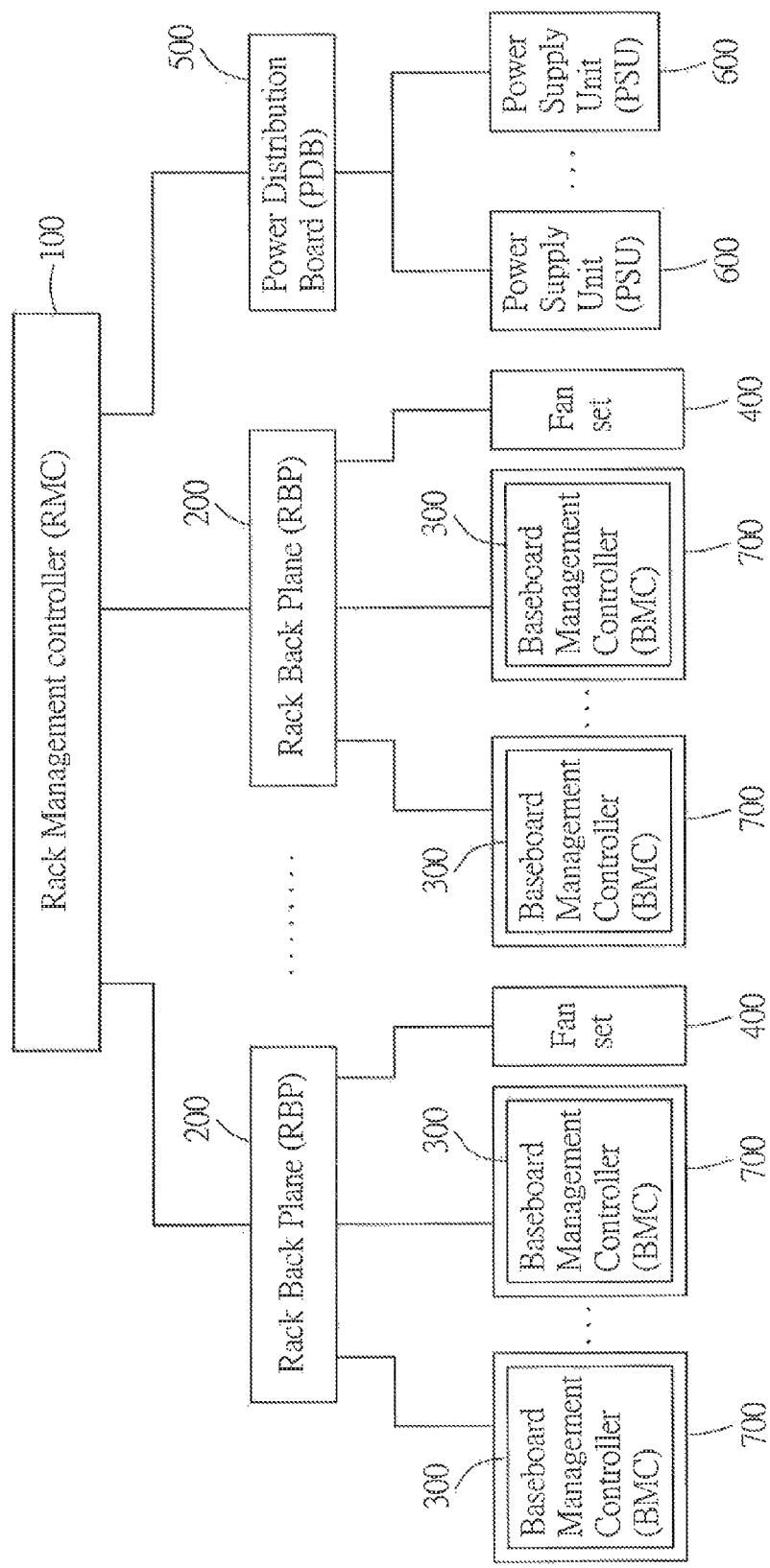
FIG. 1 is a block diagram illustrating a server rack system.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
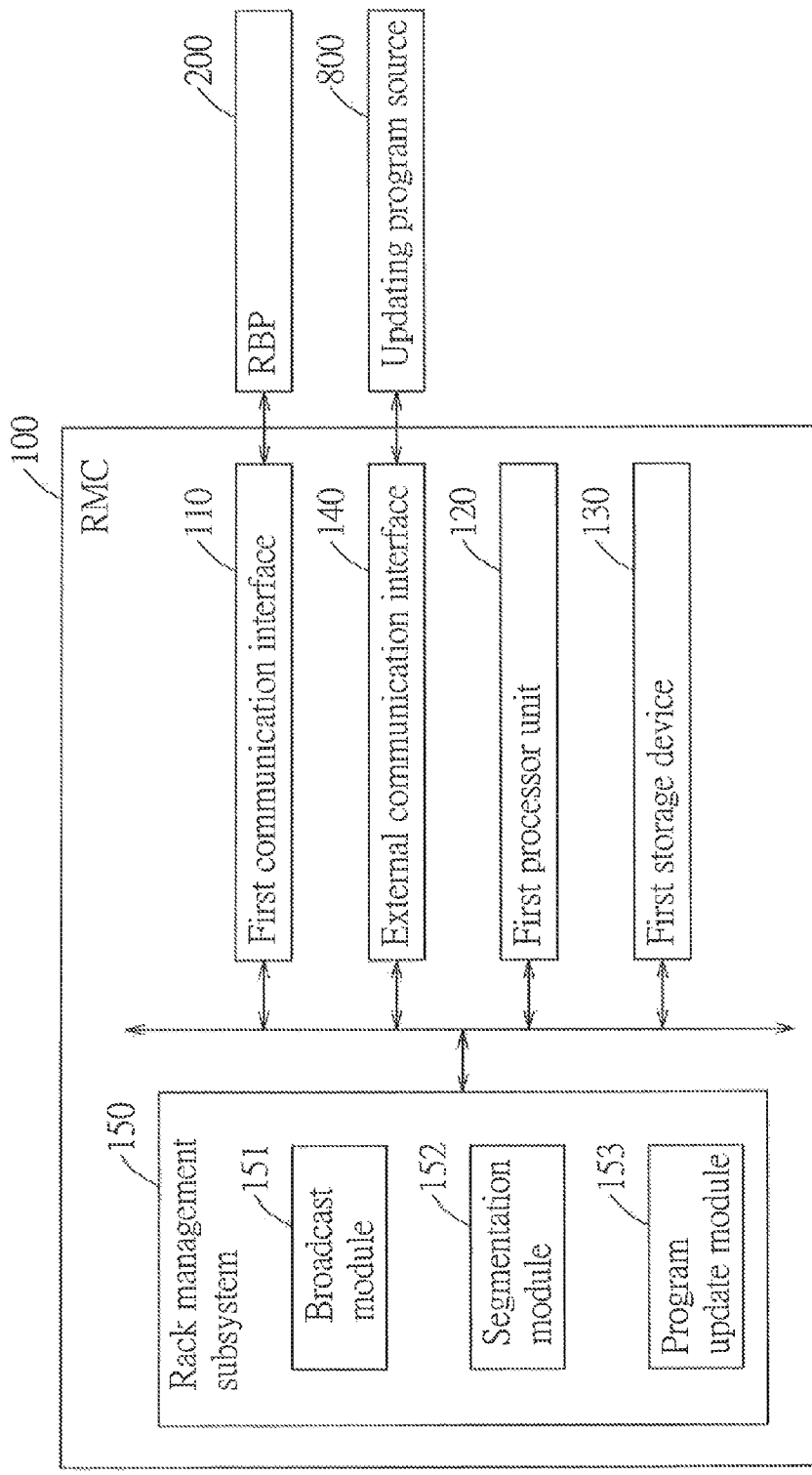
FIG. 2 is a block diagram illustrating one embodiment of components of a rack management controller (RMC) of the server rack system according to the disclosure.

Referring to FIG. 2, a block diagram showing components of an embodiment of a server rack system according to the disclosure is provided. A Rack Management Controller (RMC) 100 of the server rack system includes a first communication interface 110, a first processor 120, a first storage device 130, an external communication interface 140 and a rack management subsystem 150 which are connected electrically with each other. The first communication interface 110 is configured for communicable connection with at least one Rack Back Plane (RBP) 200. The external communication interface 140 is configured for connection to an external updating program source 800. The updating program source 800 is exemplified as a terminal device (e.g., a desktop computer, a workstation or an embedded computer) which stores a firmware updating program for firmware update of the RBP 200. The external communication interface 140 is exemplified as an Ethernet, but is not limited to the example herein.

The rack management subsystem 150 is installed and running on the first processor 120. The rack management subsystem 150 includes a broadcast module 151, a segmentation module 152 and a program update module 153. These modules are computer programs stored in the first storage device 130, and are executable by the first processor 120 to accomplish specific functions.

Figure 3:
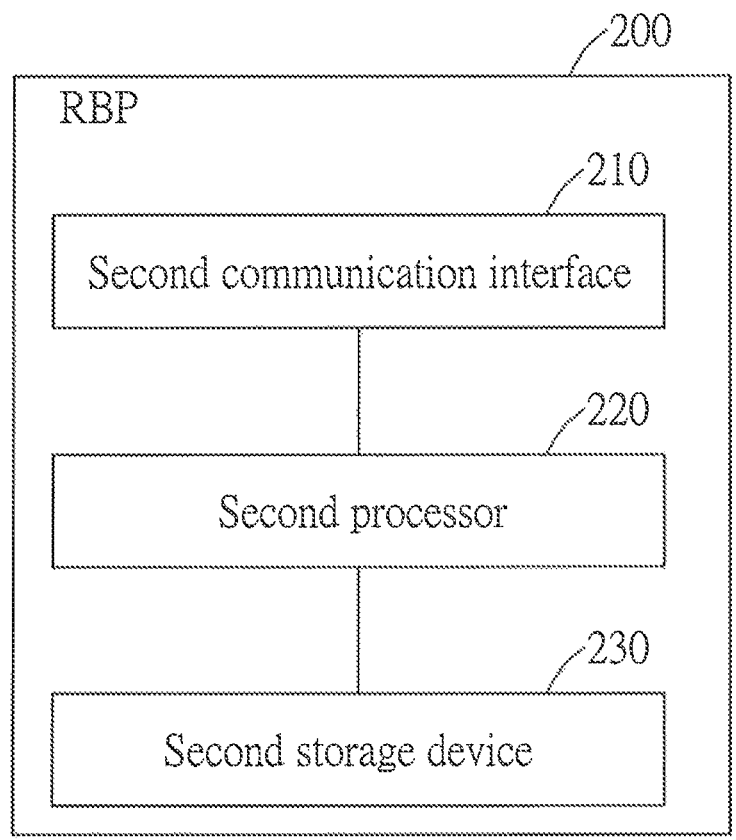
FIG. 3 is a block diagram illustrating one embodiment of components of a rack back plate (RBP) of the server rack system according to the disclosure.

Referring further to FIG. 3, a block diagram illustrates an embodiment of components of the RBP 200 according to the disclosure. The RBP 200 includes a second communication interface 210, a second processor 220 and a second storage device 230. The second processor 220 is connected electrically to the second communication interface 210 and the second storage device 230. The second storage device 230 stores an original firmware program to be executed by the second processor 220 such that the second processor 220 is able to implement designated functions of the RBP 200 while the second processor 220 is running the original firmware program. The second communication interface 210 is communicably connected to the first communication interface 110 of the RMC 100, for receiving the firmware updating program therefrom. The first and second communication interfaces 110 and 210 are based on one of $I^2C$, RS485, USB and Ethernet. The second storage device 230 is able to store the firmware updating program transmitted by the RMC 100, so that the second processor 220 is able to execute the update after receiving the complete firmware updating program. The first and second storage devices 130 and 230 are each non-volatile memory, such as flash memory. The first and second processors 120 and 220 are processors capable of execution of programming language. The server rack system, when operating in combination with servers 700 as shown in FIG. 1, may serve as a rack server.

Figure 4:
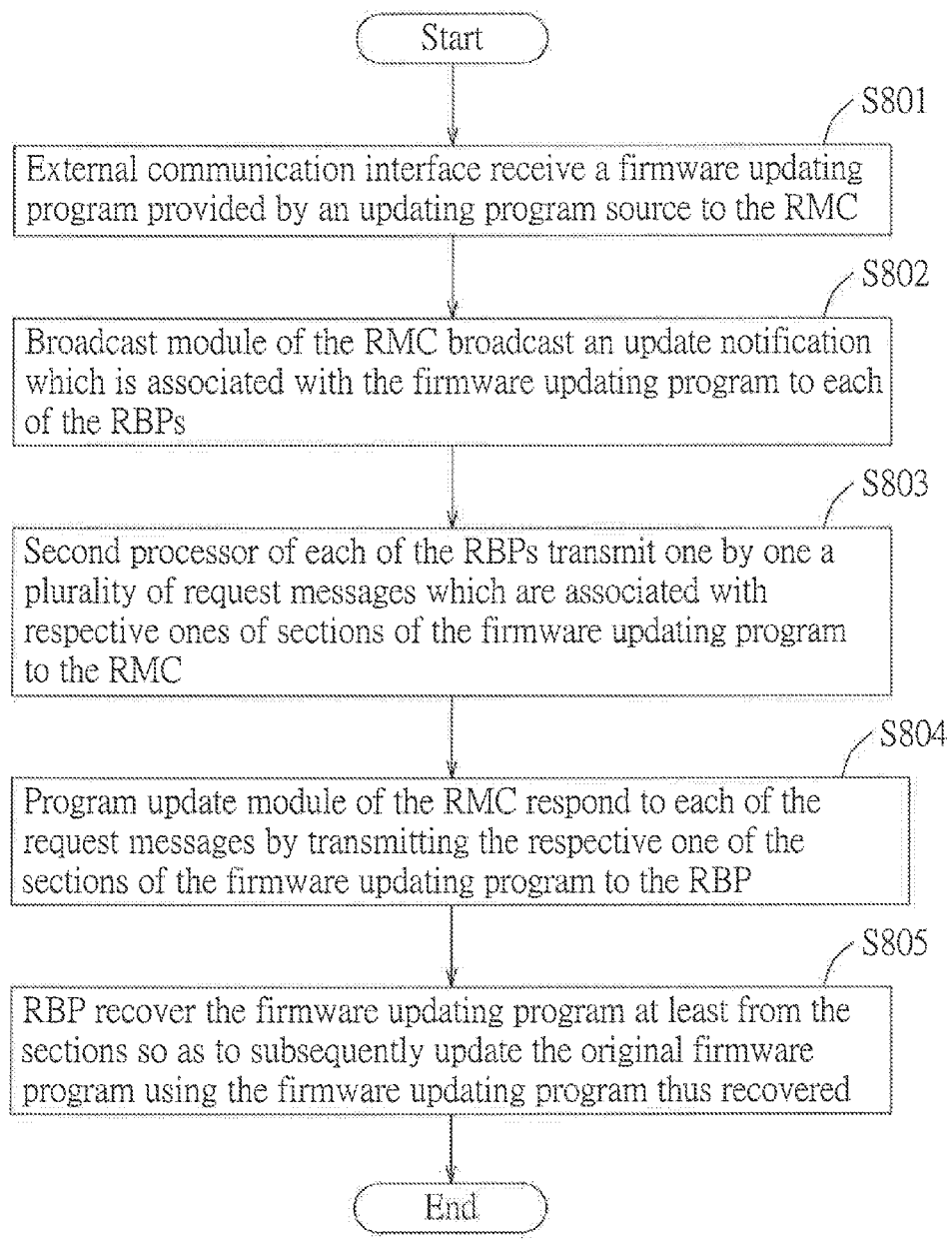
FIG. 4 is a flow chart illustrating one embodiment of a method of updating firmware of a server rack system according to the disclosure.

Referring to FIG. 4, an embodiment of a method of updating firmware of a server rack system according to the disclosure is illustrated. In step S801, the external communication interface 140 receives a firmware updating program provided by the updating program source 800 to the RMC 100. The firmware updating program thus received is then stored in the first storage device 130. In one embodiment, the firmware updating program may include a plurality of program segments. In one instance, the firmware updating program may be received by the RMC 100, and then the segmentation module 152 divides the firmware updating program into the program segments, and the segmentation module 152 numbers the program segments of the firmware updating program thus divided with respective segment numbers. In this embodiment, each of the program segments is smaller than or equal to 64 bytes. When a data size of each of the program segments is smaller than or equal to 64 bytes, better update efficiency may be achieved.

In another embodiment, the rack management subsystem 150 is not provided with the segmentation module 152.

Instead, the firmware updating program is divided in advance into a plurality of program segments by an external device, that is, the RMC 100 directly obtains the program segments from the updating program source 800. Each of these program segments in sequence is provided with a segment number for allowing the RMC 100 and the RBP 200 to be aware of an order of the program segments.

Figure 5:
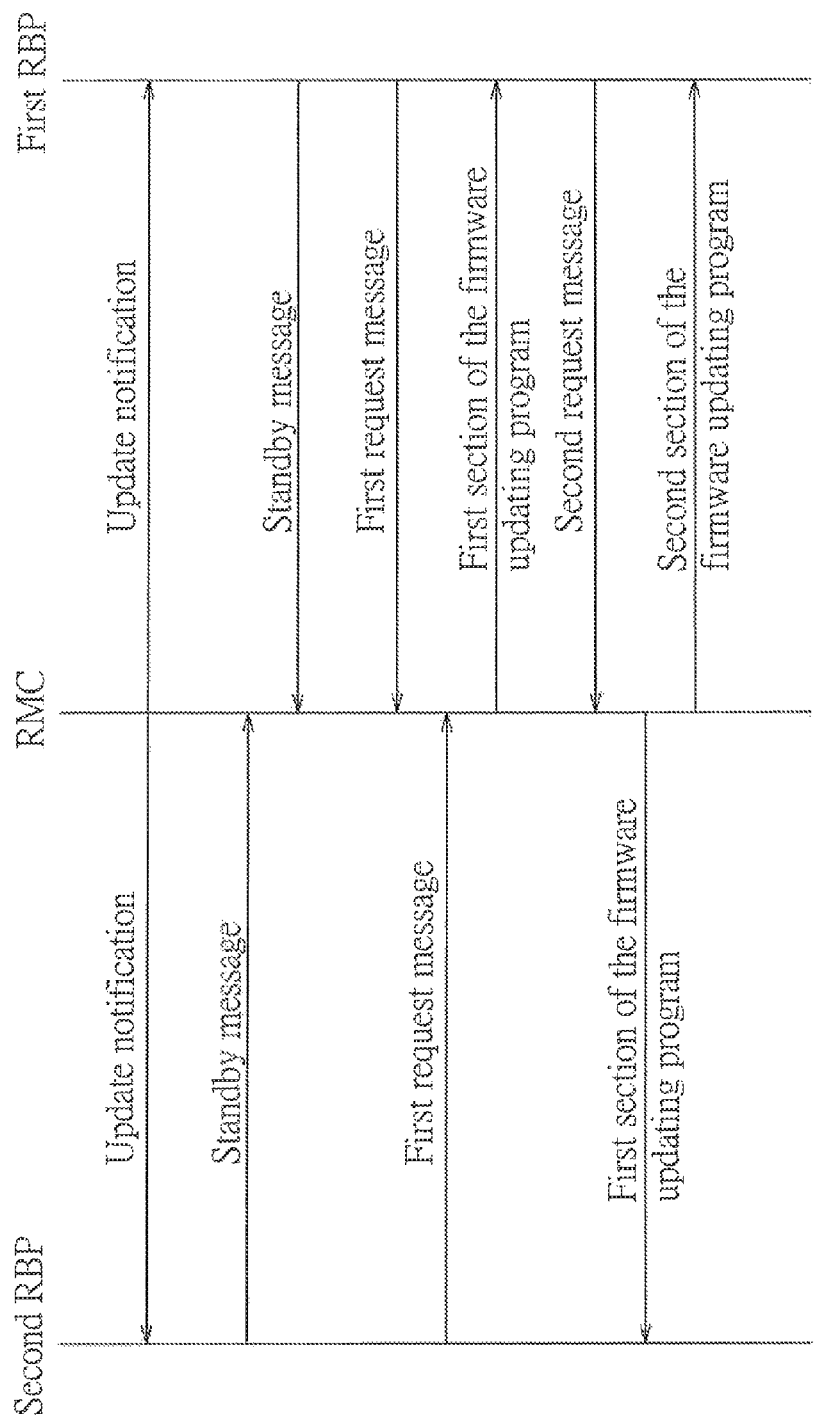
FIG. 5 is a schematic diagram showing one embodiment of signal transmissions according to the disclosure.

Referring further to FIG. 5, an example that the RMC 100 simultaneously updates firmware of two RBP 200 (i.e., a first RBP and a second RBP) is given for explanatory purposes. In step S802, the broadcast module 151 of the rack management subsystem 150 of the RMC 100 broadcasts an update notification which is associated with the firmware updating program to the second communication interface 210 of each of the RBPs 200 via the first communication interface 110. The update notification contains information of a file size of the firmware updating program and a data length of each section of the firmware updating program to be transmitted per transmission (e.g., the program segments in one embodiment). In one embodiment, the update notification may further contain information of a number of the sections to be transmitted (e.g., the program segments). Accordingly, the second processor 220 of the RBP 200 is able to record the file size of the firmware updating program or the number of the sections, so as to determine whether or not the complete firmware updating program (i.e., all of the program segments) is received. The second processor 220 of the RBP 200 which receives the update notification transmits in return a standby message to the RMC 100 via the second communication interface 210. The standby message indicates that the update notification has been received and the RBP 200 is ready for update.

In step S803, after receiving the update notification via the second communication interface 210, the second processor 220 of each of the RBPs 200 further transmits one by one a plurality of request messages associated with respective sections of the firmware updating program to the RMC 100 via the second communication interface 210. In step S804, the program update module 153 of the rack management subsystem 150 of the RMC 100 responds to the each of the request messages by transmitting in turn the respective requested one of the sections of the firmware updating program via the first communication interface 110 to the RBP 200 from which the request message is received. Upon receipt of each section of the firmware updating program, the RBP 200 subsequently stores the same in the second storage device 230 thereof.

In the case where the program segments of the firmware updating program serve as the sections of the firmware updating program, the RBP 200 is capable of determining the total number of the program segments into which the firmware updating program is divided based on the file size of the firmware updating program and the data length of each of the program segments or directly based on the number of the program segments contained in the update notification. The RBP 200 may further number the program segments with respective serial numbers. In this way, the second processor 220 of the RBP 200 requests one of the program segments numbered with a specific one of the serial numbers that is within the total number of the program segments. For example, the specific one of the serial numbers may range between 1 to 500 if the total number of the program segments is five hundred. Specifically, the request message includes a serial number of one of the program segments that is requested for transmission. In this way, after receiving the request message containing the serial number, the RMC 100 determines one of the program segments having the corresponding segment number according to the serial number (i.e., the segment number identical to the serial number), and transmits said one of the program segments corresponding to the serial number to the RBP 200 from which the request message is received. For example, when the RBP 200 requests a first program segment, the request message includes a first serial number (i.e., a serial number of 1). In response, the RMC 100 transmits a program segment that has the segment number of 1 (i.e., the first program segment). When the RBP 200 requests a second program segment, the request message includes a second serial number (i.e., a serial number of 2). In response, the RMC 100 transmits a program segment that has the segment number of 2 (i.e., the second program segment). It should be noted that in this scenario, a product serial number in the original firmware program may be overwritten when the program segments received at the RBP 200 are used for later firmware update of the original firmware program to result in an updated firmware program, and therefore, the product serial number is first stored in other memory, and will later be written back to the updated firmware program after the firmware update is complete.

Alternatively, in another embodiment, in step S802, the update notification broadcasted by the RMC 100 contains neither the aforementioned information of the data length of each of the sections of the firmware updating program, nor the information of the number of the sections of the firmware updating program. Instead, the update notification merely includes the file size of the firmware updating program. After being notified of the file size of the firmware updating program by virtue of the update notification, the RBP 200 decides on the data length of each section of the firmware updating program to be received in response to each respective request, and a total number of times it takes for transmission of the complete firmware updating program. As a result, in step S803, the request message does not contain information of the serial number of the requested program segment, but instead contains information of a starting position and a data length of a desired section of the firmware updating program. In step S804, the RMC 100, in accordance with the starting position and the data length contains in the request message, transmits a corresponding section of the firmware updating program (beginning at the starting position and having the data length) to the RBP 200 from which the request message is received. It should be noted that workloads of the RMC 100 in this embodiment are different from those of the RMC 100 in the aforementioned embodiment since the firmware updating program is not divided into the program segments in advance, but instead is transmitted in arbitrary sections as requested. Accordingly, the firmware updating program is not required to be divided into the plurality of program segments in advance by the segmentation module 152. Herein, the updating program source 800 need not provide the RMC 100 with the plurality of program segments into which the firmware updating program is divided, but instead merely provides the firmware updating program as a whole. In some embodiments, the data lengths of the desired sections of the firmware updating program as requested by different RBPs 200 are not necessarily identical. It should be noted that in this scenario, since the RBP 200 is capable of self-determining the starting position and the data length of each of the sections of the firmware updating program for respective requests, the RBP 200 may bypass a section of the firmware updating program associated with the product serial number in the original firmware program and only requesting the other sections, so as to prevent overwriting the product serial number in the original firmware program when the sections of the firmware updating program thus received are used for subsequent firmware update of the original firmware program.

In some embodiments, the RMC 100 designates the data length of each of the sections of the firmware updating program for respective transmission of the same, and stores the data length in the update notification. Accordingly, the RBP 200 is able to request one by one the sections of the firmware updating program corresponding to the respective starting position according to the data length contained in the update notification. In this way, the request message may include the starting position of the requested section of the firmware updating program without containing information of the data length.

Referring to FIG. 5, the first RBP first transmits a first request message to request a first section of the firmware updating program (or a first program segment) from the RMC 100. After receiving the first request message transmitted by the first RBP, the RMC 100 responds to the first request message by transmitting the first section of the firmware updating program to the first RBP. The first RBP then transmits a second request message to request a second section of the firmware updating program (or a second program segment) from the RMC 100. After receiving the second request message transmitted by the first RBP, the RMC 100 responds to the second request message by transmitting the second section of the firmware updating program to the first RBP. On the other hand, the second RBP similarly first transmits a first request message to request the first section of the firmware updating program from the RMC 100. After receiving the first request message transmitted by the second RBP, the RMC 100 responds to the first request message by transmitting the first section of the firmware updating program to the second RBP.

For the purpose of enabling each of the RBPs 200 to request sections of the firmware updating program (or the program segments) from the RMC 100 at the same time without the requirement of waiting for a single one of the RBPs 200 to receive the complete firmware updating program (i.e., all of the sections), the RMC 100 is provided with a First In First Out (FIFO) queue which is associated with an order of receipt of the request messages, so that the RMC 100 gives precedence to responding to the request message received earlier in order. In this embodiment, the aforementioned first section of the firmware updating program refers to a first requested section of the same, and the second section of the firmware updating program refers to a second requested section of the same, and are not necessarily a first-in-order and a second-in-order ones of the sections into which the firmware updating program is divided. In one embodiment, the RBP 200 transmits the request messages one by one according to a sequential order of the sections into which the firmware updating program is divided. For example, the RBP 200 requests the sections of the firmware updating program from the RMC 100 according to the sequential order starting from the first one of the sections into which the firmware updating program is divided. Alternatively, the RBP 200 may request the sections of the firmware updating program according to the sequential order starting from another one of the sections into which the firmware updating program is divided. However, the embodiment of the method is not limited to the disclosure herein. For example, the RBP 200 need not request transmission of the sections according to the sequential order, and may transmit the request messages one by one according to a random order.

Figure 6:
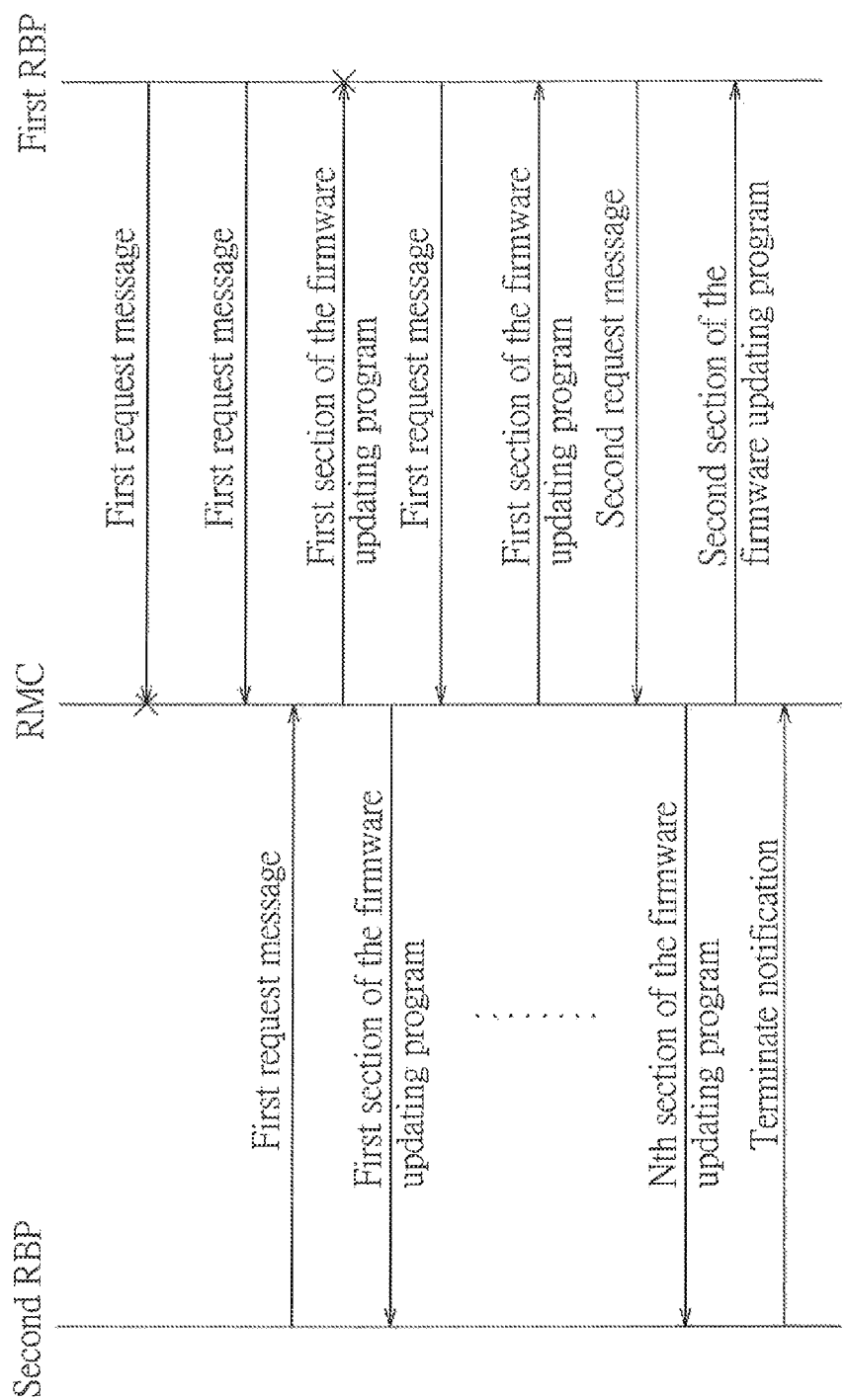
FIG. 6 is a schematic diagram showing another embodiment of signal transmissions according to the disclosure.

Referring to FIG. 6, a schematic diagram illustrates one embodiment of signal transmission according to the disclosure. When an error occurs while the RBP 200 which has transmitted a request message is receiving the requested section (see the cross at the middle of FIG. 6), the second processor 220 of the RBP 200 transmits once again (i.e., for the second time) the same request message which includes the same information to the RMC. For example, after the first RBP first transmits the first request message, the RMC 100 does not correctly receive the first request message, and an error occurs. Since the first RBP does not receive a response, i.e., the first section of the firmware updating program, from the RMC 100 within a predetermined response time, the first RBP transmits once again the first request message. In other words, after transmitting the request message (i.e., subsequent to step S803), the RBP 200 waits for the predetermined response time. If the RBP 200 does not receive the requested one of the sections of the firmware updating program, the RBP 200 transmits once again the request message.

When the first request message transmitted by the first RBP for the second time is successfully received at the RMC 100, the RMC 100 transmits the first section of the firmware updating program corresponding to the first request message back to the first RBP. At this moment, when an error occurs while the first RBP is receiving the first section of the firmware updating program (see the cross at the right-hand side of FIG. 6) (for example, the first RBP does not receive the first section of the firmware updating program from the RMC 100 within another predetermined response time), or when a receipt error occurs within the predetermined response time (for example, the first RBP receives only a part of the first section, rather than the complete first section, or receives an erroneous one of the sections), the first RBP transmits once again (i.e., for the third time) the first request message to the RMC 100, without the need of reporting an occurrence of error to the RMC 100, so as to effectively reduce the number of signal transmissions.

Based on the aforementioned approach, the RBP 200 does not proceed to update its firmware until the RBP 200 receives all of the requested sections of the firmware updating program (not necessarily all sections of the firmware updating program in the case where the section associated with the product serial number is bypassed) from the RMC 100. Referring back to FIG. 4, in step S805, after receiving all requested sections of the firmware updating program, the RBP 200 recovers the firmware updating program at least from the received sections so as to subsequently update the original firmware program using the firmware updating program thus recovered. In one embodiment, when the second processor 220 of the RBP 200 determines that the sections of the firmware updating program (or the program segments) stored in the second storage device 230 are complete, the second processor 220 combines these sections in an order to recover the firmware updating program, so as to subsequently update the original firmware program, which is currently run on the second processor 220, using the firmware updating program. In one embodiment where the section associated with the product serial number is bypassed, the second processor 220 of the RBP 200 combines the other sections thus requested and the section associated with the product serial number in the original firmware program, so as to recover the firmware updating program for subsequent firmware update.

It should be noted that each of the RBPs 200 may further include a backup scheme (not shown) for storage of an image file of the original firmware program. If the firmware updating program is not usable for firmware update, the original firmware program may be restored to prevent the RBP 200 from malfunction if update failure occurs. In a case that the RBP 200 is not provided with the backup scheme, the RCM 100 which initiates this firmware update is configured to perform an image checksum upon the firmware updating program to ensure successful firmware update of the RBPs 200.

Before the original firmware program is updated, the RBP 200 transmits a terminate notification to the RMC 100 for notifying that transmission of all requested sections of the firmware updating program has been completed. As shown in FIG. 6, after receiving a last one of the sections of the firmware updating program (i.e., the Nth section, N is a natural number), the second RBP transmits the terminate notification to the RMC 100. As a result, when the RMC 100 receives neither a request message from one of the RBPs 200 nor a terminate notification therefrom for a period of time, it may be concluded that said one of the RBPs 200 malfunctions and requires trouble shooting.

It should be further noted that, compared with a conventional approach to firmware update, in which the RBPs only passively receive each section of a firmware updating program and respond to the RMC as to whether or not the section is correctly received, the method of this disclosure allows the RBPs to actively request arbitrary sections of the firmware updating program after the RMC broadcasts the notification. Therefore, the RBPs has made a transition from passive roles to active roles.

To sum up, the method of updating firmware of a server rack system according to the disclosure changes the conventional steps of first transmitting a section of the firmware updating program by the RMC to the RBP, then having the RBP respond to the RMC as to whether or not the section is correctly received, and after that transmitting a next section of the firmware updating program by the RMC if the response indicates correct reception, so that transmission of response signals as to whether or not the respective sections of the firmware updating program are correctly received may be omitted. Meanwhile, all of the RBPs may be updated simultaneously so as to further save time by half compared with the conventional steps, and to reduce a risk of update interruption due to an update error in one of the RBPs.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of updating firmware of a server rack system, the server rack system including a rack management controller (RMC) and a rack back plane (RBP), the RMC including a first processor, a first storage device, a first communication interface, an external communication interface and a rack management subsystem, the rack management subsystem including a broadcast module and a program update module, the RBP including a second processor, a second storage device and a second communication interface, the second storage device storing an original firmware program to be executed by the second processor, the method comprising the following steps of:

receiving, by the external communication interface, a firmware updating program which is to be stored in the first storage device of the RMC;

broadcasting, by the broadcast module of the rack management subsystem of the RMC, an update notification which is associated with the firmware updating program to the second communication interface of the RBP via the first communication interface;

after receiving the update notification via the second communication interface, transmitting one by one, by the second processor of the RBP, a plurality of request messages which are associated with respective ones of sections of the firmware updating program to the RMC via the second communication interface;

responding, by the program update module of the rack management subsystem of the RMC, to each of the request messages by transmitting the respective one of the sections of the firmware updating program via the first communication interface to the RBP which transmits the request message; and after receiving the sections of the firmware updating program with which the request messages are associated, recovering, by the RBP, the firmware updating program at least from the sections with which the request messages are associated so as to update the original firmware program using the firmware updating program thus recovered.

2. The method as claimed in claim 1, the RBP being plural in number, wherein in the step of transmitting one by one a plurality of request messages, the second processors of the RBPs are allowed to transmit the request messages to the RMC at the same time;

wherein the step of responding to each of the request messages includes transmitting one by one, by the program update module, the respective ones of the sections of the firmware updating program via the first communication interface to respective ones of the RBPs which transmit the request messages based on a First In First Out (FIFO) queue which is associated with an order of receipt of the request messages by the RMC; and wherein the step of recovering the firmware updating program includes recovering, by the RBPs at the same time, the firmware updating program so that the RBPs are updated simultaneously, each of the RBPs recovering the firmware updating program at least from the sections with which the request messages transmitted thereby are associated.

3. The method as claimed in claim 1, wherein the step of receiving a firmware updating program includes receiving, by the external communication interface, the firmware updating program which includes a plurality of program segments, the program segments serving as the sections of the firmware updating program, respectively;

wherein the step of transmitting one by one the request messages includes transmitting one by one, by the second processor of the RBP, the request messages each including a serial number of a respective one of the program segments to the RMC; and wherein the step of responding to each of the request messages includes transmitting, by the program update module, a respective one of the program segments corresponding to the serial number via the first communication interface to the RBP which transmits the request message.

4. The method as claimed in claim 3, the rack management subsystem further including a segmentation module, wherein the step of receiving a firmware updating program further includes dividing, by the segmentation module, the firmware updating program into the program segments, and numbering the program segments of the firmware updating program thus divided with respective serial numbers.

5. The method as claimed in claim 3, further comprising:
when an error occurs while the RBP which transmits one of the request messages is receiving the respective one of the program segments corresponding to the serial number, transmitting once again, by the second processor of the RBP, a request message which includes the same serial number of a corresponding one of the program segments to the RMC.

6. The method as claimed in claim 3, wherein in the step of transmitting one by one the request messages:
when the RBP which transmits a current one of the request messages successfully receives the respective one of the program segments corresponding to the serial number, transmitting, by the second processor of the RBP, a next one of the request messages which includes a next serial number of a corresponding one of the program segments to the RMC.

7. The method as claimed in claim 3, wherein the update notification includes at least one of a file size of the firmware updating program or a number of program segments of the firmware updating program.

8. The method as claimed in claim 3, wherein the step of transmitting one by one a plurality of request messages further includes transmitting one by one according to a sequential order of the program segments, by the second processor of the RBP, the request messages each of which includes the serial number of the respective one of the program segments to the RMC.

9. The method as claimed in claim 3, wherein the step of transmitting one by one a plurality of request messages further includes transmitting one by one according to a random order of the program segments, by the second processor of the RBP, the request messages each of which includes the serial number of the respective one of the program segments to the RMC.

10. The method as claimed in claim 1, prior to the step of transmitting one by one a plurality of request messages, further comprising:
transmitting, by the second processor of the RBP, a standby message to the RMC, the standby message indicating that the update notification has been received and the RBP is ready for update.

11. The method as claimed in claim 1, prior to the step of recovering the firmware updating program at least from the sections of the firmware updating program with which the request messages are associated, further comprising:
after receiving the sections of the firmware updating program with which the request messages are associated, transmitting, by the RBP, a terminate notification to the RMC for notifying that transmission of all the sections has been completed.

12. The method as claimed in claim 1, wherein the step of transmitting one by one a plurality of request messages includes transmitting one by one, by the second processor of the RBP, the request messages which are associated with the respective ones of the sections of the firmware updating program, each of which is smaller than or equal to 64 bytes, to the RMC via the second communication interface.

13. The method as claimed in claim 1,
wherein the step of transmitting one by one a plurality of request messages includes transmitting one by one, by the second processor of the RBP, the request messages each of which includes a starting position and a data length of the respective one of the sections of the firmware updating program to the RMC; and
wherein the step of responding to each of the request messages includes transmitting, by the program update module, the respective one of the sections of the firmware updating program which corresponds to the starting position and the data length via the first communication interface to the RBP which transmits the request message.

14. The method as claimed in claim 1, subsequent to the step of transmitting one by one a plurality of request messages, further comprising:
when the RBP does not receive a corresponding one of the sections of the firmware updating program within a predetermined response time after transmission of one of the request messages or when a receipt error occurs within the predetermined response time, transmitting once again, by the second processor of the RBP, said one of the request messages which is associated with the corresponding one of the sections of the firmware updating program to the RMC.

15. A server rack system comprising:
a rack management controller (RMC) which includes a first processor, a first storage device, a first communication interface, an external communication interface and a rack management subsystem that are electrically connected to each other, said rack management subsystem including a broadcast module and a program update module; and
a rack back plane (RBP) which includes a second processor, a second storage device and a second communication interface communicably connected to said first communication interface, said second storage device storing an original firmware program to be executed by said second processor;
wherein
said external communication interface receives a firmware updating program which is to be stored in said first storage device of said RMC,
said broadcast module of said rack management subsystem of said RMC broadcasts an update notification which is associated with the firmware updating program to said second communication interface of said RBP via said first communication interface,
after receiving the update notification via said second communication interface, said second processor of said RBP transmits one by one a plurality of request messages which are associated with respective ones of sections of the firmware updating program to said RMC via said second communication interface,
said program update module of said rack management subsystem of said RMC responds to each of the request messages by transmitting the respective one of the sections of the firmware updating program via said first communication interface to said RBP which transmits the request message, and
after receiving the sections of the firmware updating program with which the request messages are associated, said RBP recovers the firmware updating program at least from the sections with which the request messages are associated so as to update the original firmware program using the firmware updating program thus recovered.

16. The server rack system as claimed in claim 15,
wherein said RBP is plural in number;

wherein said second processors of said RBPs are allowed to transmit at the same time the request messages one by one to said RMC via said second communication interface;

wherein the program update module transmits one by one the respective ones of the sections of the firmware updating program via said first communication interface to said RBPs which transmit the request messages based on a First In First Out (FIFO) queue which is associated with an order of receipt of the request messages by said RMC; and wherein said RBPs recover at the same time the firmware updating program so that said RBPs are updated simultaneously, each of said RBPs recovering the firmware updating program at least from the sections with which the request messages transmitted thereby are associated.

17. The server rack system as claimed in claim 15, wherein said external communication interface receives the firmware updating program which includes a plurality of program segments, the program segments serving as the sections of the firmware updating program, respectively;

wherein said second processor of said RBP transmits one by one the request messages each of which includes a serial number of a respective one of the program segments to said RMC; and wherein in response to each of the request messages, said program update module transmits a respective one of the program segments corresponding to the serial number via said first communication interface to said RBP which transmits the request message.

18. The server rack system as claimed in claim 17, wherein said rack management subsystem further includes a segmentation module; and wherein said segmentation module divides the firmware updating program into the program segments, and numbers the program segments of the firmware updating program thus divided.

19. The server rack system as claimed in claim 17, wherein the update notification includes at least one of a file size of the firmware updating program or a number of program segments of the firmware updating program.

20. The server rack system as claimed in claim 15, wherein said second processor of said RBP transmits in turn the each request message which includes a starting position and a data length of the respective one of the sections of the firmware updating program to said RMC; and wherein in response to each of the request messages, said program update module transmits the respective one of the sections of the firmware updating program which corresponds to the starting position and the data length via said first communication interface to said RBP which transmits the request message.

* * * * *